Nov. 20, 1934.  E. J. SCHNEIDER  1,981,428
TRANSMISSION
Filed April 21, 1933  4 Sheets-Sheet 1
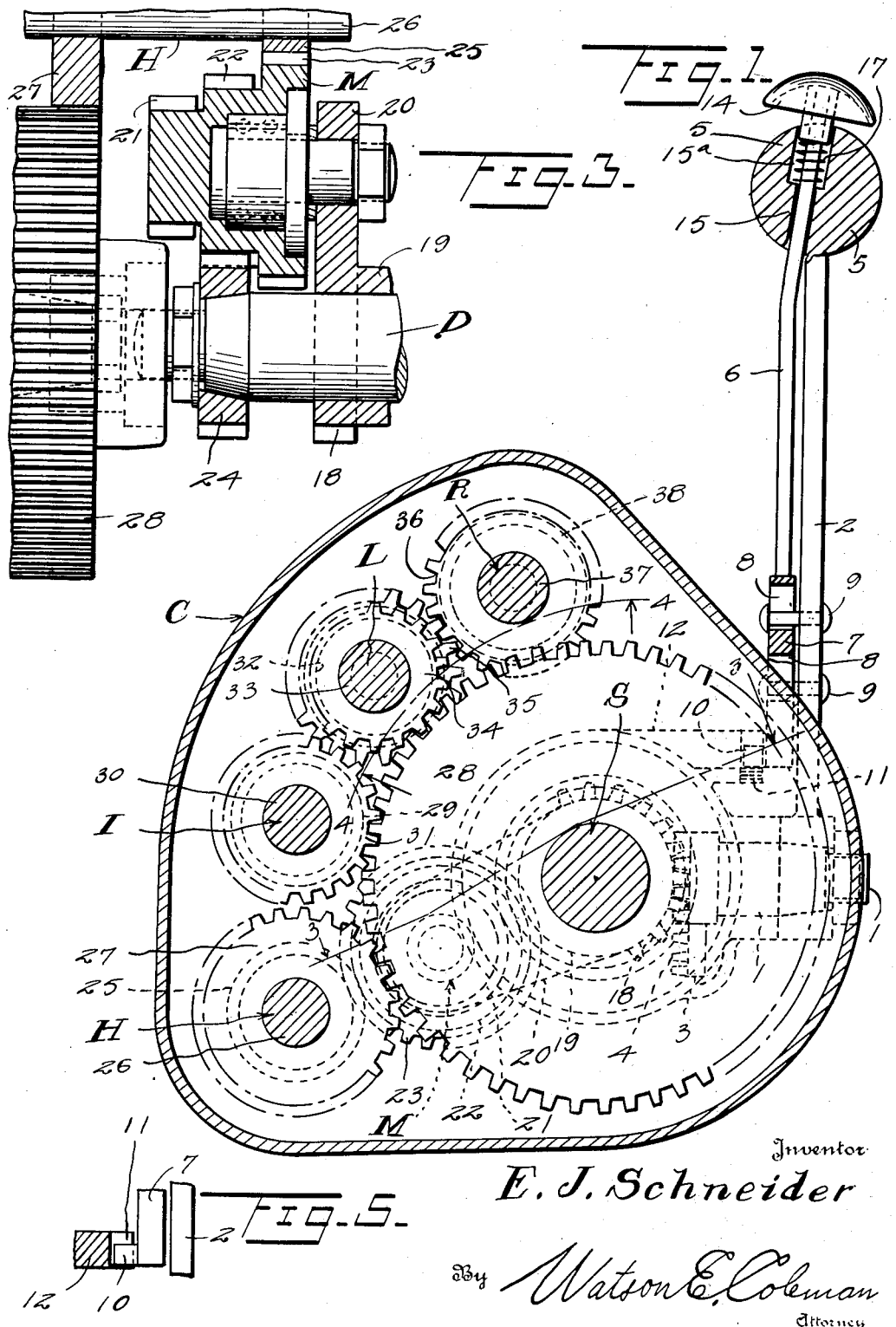
Inventor
E. J. Schneider
By Watson E. Coleman
Attorney

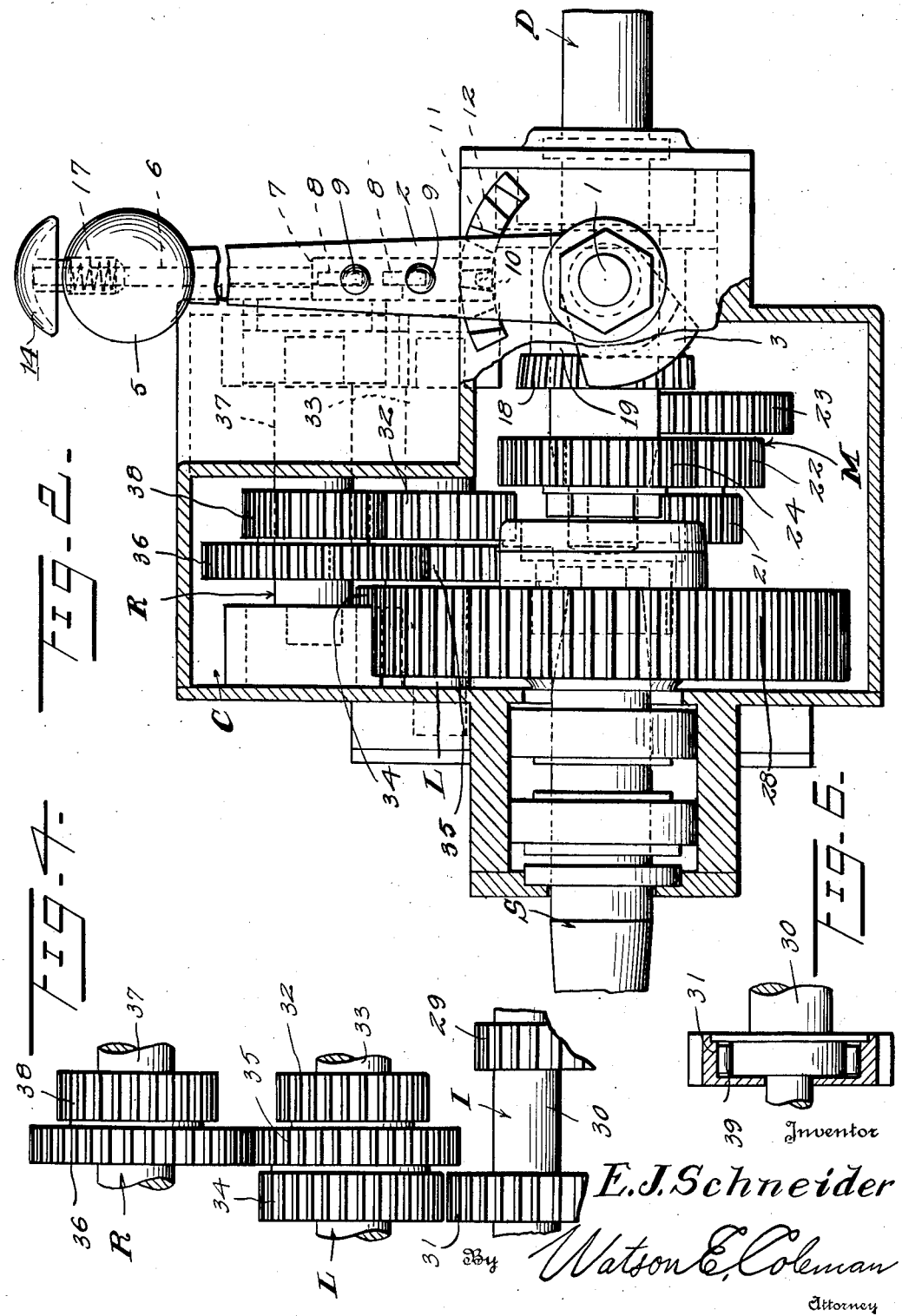

Nov. 20, 1934.  E. J. SCHNEIDER  1,981,428
TRANSMISSION
Filed April 21, 1933    4 Sheets-Sheet 3

Inventor
E. J. Schneider
By Watson E. Coleman
Attorney

Nov. 20, 1934.                E. J. SCHNEIDER                1,981,428
                                 TRANSMISSION
                            Filed April 21, 1933      4 Sheets-Sheet 4
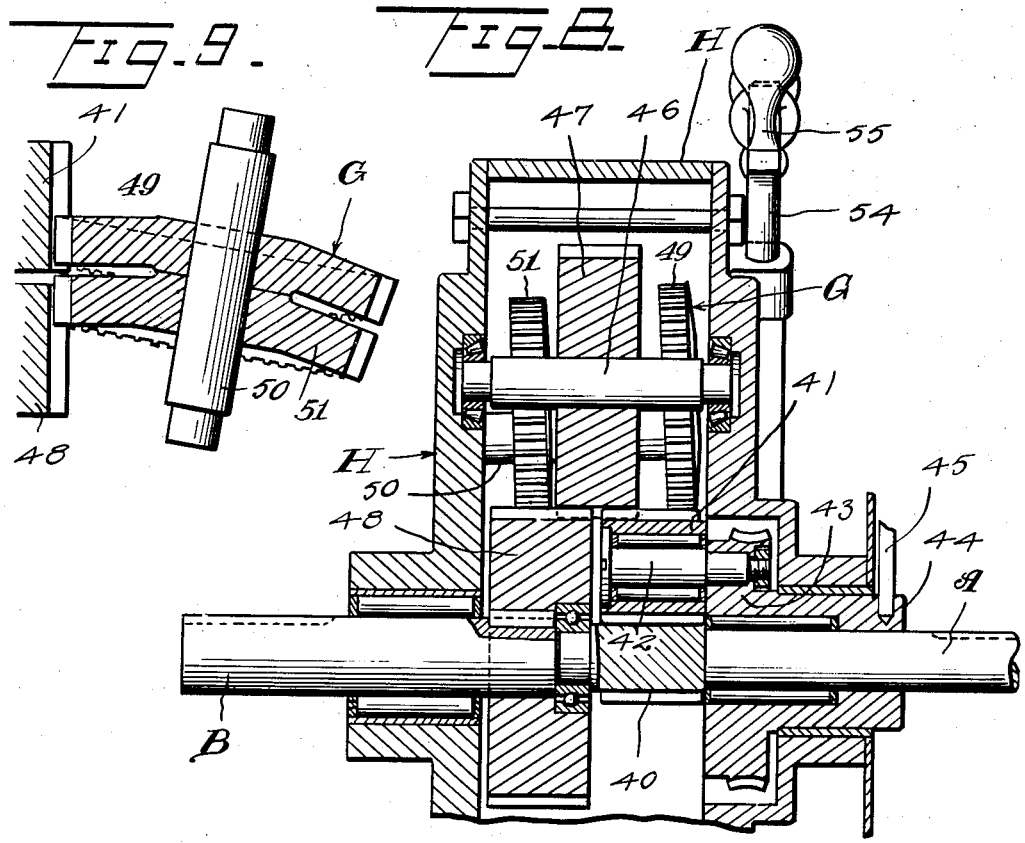
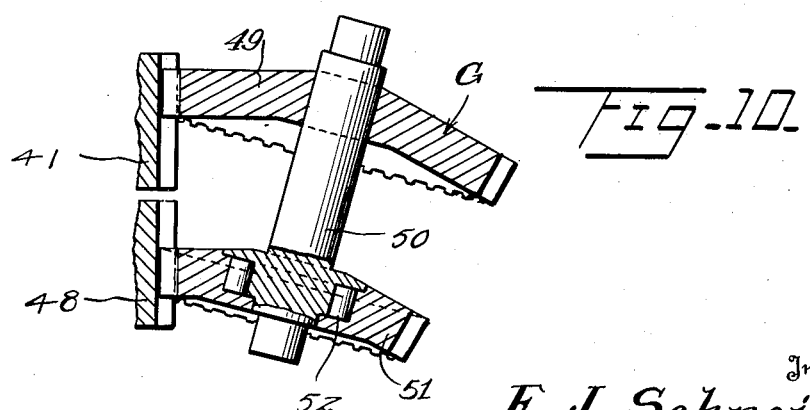
Inventor
E. J. Schneider
By Watson E. Coleman
Attorney Patented Nov. 20, 1934

1,981,428

UNITED STATES PATENT OFFICE 1,981,428

TRANSMISSION

Edward J. Schneider, Rock Island, Ill.

Application April 21, 1933, Serial No. 667,257

5 Claims. (Cl. 74—353)

This invention relates to a transmission and has relation more particularly to a device of this kind of an automotive type, and it is an object of the invention to provide a transmission wherein progress can be made from one speed to the next higher or lower without stopping the input or drive shaft or removing the load from the output or driven shaft.

Another object of the invention is to provide a transmission comprising a mating gear substantially constantly in mesh with one of a plurality of gears and wherein the intermediate speed gear has associated therewith an overriding clutch, preferably of a silent ratchet type.

A further object of the invention is to provide a transmission of this kind wherein the reverse rotation of the output or driven shaft is accomplished through the low gear assembly, all of the forward speed assemblies having gears constantly in mesh with a king gear.

The invention consists in the details of construction and in the combination and arrangement of the several parts of my improved transmission whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating a transmission constructed in accordance with an embodiment of my invention;

Figure 2 is also a view partly in section and partly in elevation of the transmission as illustrated in Figure 1, said Figure 2 however being on substantially a quarter turn with respect to Figure 1;

Figure 3 is a fragmentary sectional view taken substantially on the line 3—3 of Figure 1;

Figure 4 is a fragmentary sectional view taken substantially on the line 4—4 of Figure 1;

Figure 5 is a fragmentary view partly in section and partly in elevation illustrating certain features of the latch for the hand lever as herein employed;

Figure 6 is a fragmentary view partly in section and partly in elevation illustrating in a general way certain features of the overriding clutch as herein employed;

Figure 8 is a fragmentary sectional view taken substantially on the line 8—8 of Figure 7 looking in the direction of the arrows, certain of the parts being in elevation;

Figure 9 is a fragmentary detailed sectional view taken substantially on the line 9—9 of Figure 7 looking in the direction of the arrows;

Figure 10 is a fragmentary detailed sectional view taken substantially on the line 10—10 of Figure 7 looking in the direction of the arrows;

Figure 7:
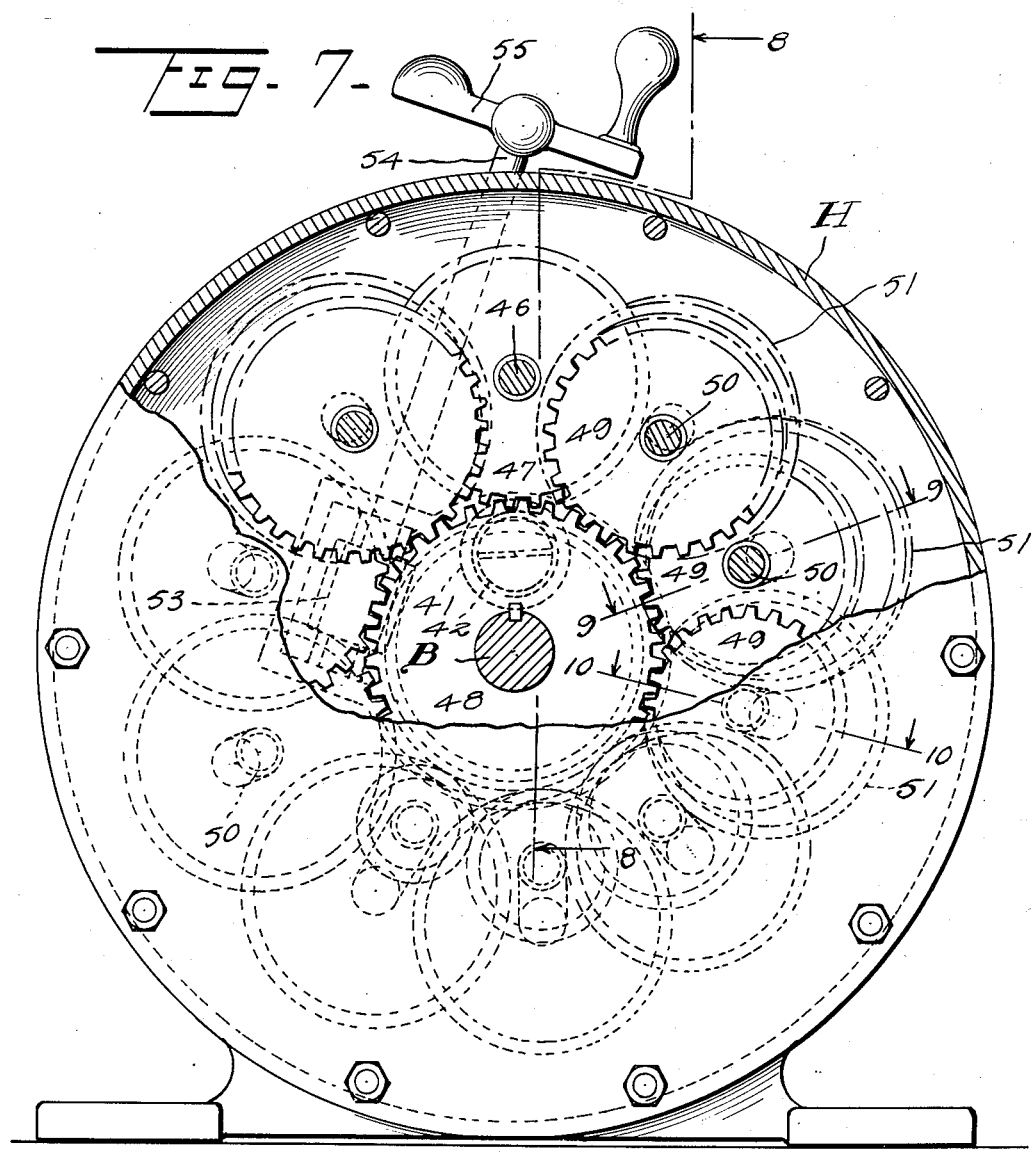
Figure 7 is a view partly in section and partly in side elevation illustrating a transmission constructed in accordance with a further embodiment of my invention.

As disclosed in the accompanying drawings, D designates a drive or input shaft and S denotes a driven or output shaft. As herein disclosed these two shafts are in alignment and extend within and are suitably supported by a housing or casing C of desired dimensions and configuration. Extending within the housing or casing C and rotatably supported by a wall thereof is a stub shaft 1. Fixed to the outer end portion of this shaft 1 is the lower extremity of an upstanding hand lever 2. The inner end portion of the shaft 1 carries and has movable therewith a sector arm 3. The outer or free end portion of this arm 3 is provided with an arcuate rack 4 for a purpose to be hereinafter referred to.

The upper end portion of the hand lever 2 is provided with a ball or hand grasp 5 and slidably disposed through said ball or hand grasp 5 is the operating rod 6 for a latch member 7. This latch member 7 comprises a plate having a plurality of slots 8 through which are directed the headed guide pins 9 whereby the latch member is supported upon the hand lever 2 for movement in a direction lengthwise of said hand lever. The lower portion of the plate 7 is provided with an outstanding lug 10 which is adapted to selectively engage from below within one of the recesses or notches 11 provided in the plate 12. This plate 12 extends out from a wall of the housing or casing C and is preferably arranged on a curvature concentric to the stub shaft 1.

The rod 6 extends above the ball or hand grasp 5 and to said upper portion is fixed an operating member 14. The opening 15 in the ball or member 5 through which the rod 6 is directed has its upper portion enlarged as at 15a and within this enlarged portion 15a is arranged an expansible member 17, herein disclosed as a coil spring of desired tension, encircling the rod 6 and interposed between the bottom of the enlarged portion 15a of the opening 15 and the operating member 14 whereby the rod 6 is constantly urged in a direction to maintain the lug 10 of the plate 7 in working position within a recess or notch 11 of the plate 12.

When it is desired to move the shaft 1 together with the sector arm 3, the rod 6 is depressed sufficient to the free the lug 10 from the plate 12 whereupon the lever 2 is rocked as required and upon release of the pressure upon the rod 6 as applied directly upon the member 14, the expansible member or spring 17 will throw the rod 6 upwardly and swing the lug 10 into locking engagement within a notch or recess 11.

The rack 4 of the sector arm 3 is constantly engaged with a gear member 18 carried by and rotating with a sleeve 19 freely mounted on the inserted end portion of the drive or input shaft D. Radiating from this sleeve 19 is an arm or elongated support 20 and operatively mounted upon the outer end portion of this arm or support 20 is a mating gear assembly M comprising, as particularly illustrated in Figure 3 of the accompanying drawings, three gears 21, 22 and 23 formed consecutively of increased diameters.

The intermediate gear 22 of the assembly M is constantly in mesh with the power gear 24 fixed upon the inserted end portion of the shaft D for rotation therewith. As the sleeve 19 is rotated or oscillated upon desired manipulation of the lever 2 the gear 22 will readily roll as required around the gear 24 to allow for the desired adjustment. When the lever 2 has been adjusted for high speed the gear 23 of greatest diameter of the assembly M meshes with a pinion 25 comprised in the high gear assembly H. This pinion 25 is fixed to a shaft 26 rotatably supported in a conventional manner by certain of the walls of the housing or casing C. The shaft 26 also has fixed thereto for rotation therewith a gear 27 of desired radius which is constantly in mesh with a king gear 28 fixed to the inserted end portion of the driven or output shaft S. Figure 3 shows the transmission in adjustment for high speed and as is believed to be clearly obvious from such figure power from the shaft D will be transmitted through the gears 24, 22, 23 and pinion 25, shaft 26 and gears 27 and 28 to the driven or output shaft S.

When the assembly M is swung into a second position through proper manipulation of the lever 2, the gear 22 meshes with the pinion 29 comprised in the intermediate gear assembly I. This pinion 29 is fixed to rotate with the shaft 30 also suitably supported by certain of the walls of the casing or housing C, and this shaft 30 also has fixed for rotation therewith a gear 31 constantly meshing with the king gear 28.

With the mating gear assembly M in proper adjustment for intermediate speed, power from the shaft D will be transmitted to the shaft S through the gears 24, 22, pinion 29 and shaft I and gears 31 and 28.

In a third adjustment of the assembly M as effected through the lever 2, the gear 21 meshes with a gear 32 comprised in a low gear assembly L. This gear 32 is fixed for rotation with a shaft 33 suitably supported by certain of the walls of the housing or casing C and said shaft 33 also has fixed thereto for rotation therewith a gear 34 constantly meshing with the king gear 28. With the gear assembly M in desired adjusted position the shaft S will be driven at low speed through the gears 24, 22 and 32 and through the shaft 33 and gears 34 and 28.

The shaft 33 also has fixed thereto for rotation therewith a gear 35 which is constantly in mesh with a gear 36 comprised in the reverse gear assembly R. This gear 36 is fixed for rotation with a shaft 37 suitably supported by certain of the walls of the casing or housing C and said shaft 37 also has fixed for rotation therewith a second gear 38 with which is adapted to engage the gear 21 of the mating gear assembly M. It is, therefore, believed to be clearly apparent that reverse rotation of the shaft S is accomplished through the gears 24, 21, 38 and through the shaft 37 and gears 36, 35, 34 and 28.

When the lever 2 is operated to adjust the arm or support 20 to bring the gear assembly M between the low gear assembly L and the reverse gear assembly R the transmission is in neutral.

With a transmission constructed as hereinbefore described it is believed to be readily understood that progress can be made from one speed to the next without stopping the input or drive shaft D or removing the load from the driven or output shaft S. It is only required that the lever 2 be operated or shifted to properly position the gear assembly M. One of the gears M is substantially constantly in mesh with a gear of the various speed assemblies, that is to say, a gear of the mating assembly does not leave the mesh of a gear of one of the other assemblies by more than one-third the depth of the tooth until it starts meshing with the next or succeeding gear assembly. It will, therefore, be readily seen that the mating gear assembly is never completely disengaged from any of the other gear assemblies when the driven or output shaft S is rotating in one direction. To reverse the direction of rotation of the shaft S it is necessary to stop the drive or input shaft D.

As illustrated in Figure 6 of the accompanying drawings, the gear 31 and the associated shaft 30 as comprised in the intermediate gear assembly have associated therewith a conventional type of overriding clutch or silent ratchet as generally indicated at 39. This clutch or ratchet allows return travel of the mating gear assembly from the low speed to the high speed without any interference or hindrance being offered by the intermediate gear assembly.

As particularly illustrated in Figures 2 and 3 of the drawings, it is to be noted that the king gear 28 is of a material width to allow for the proper positioning of the intermediate gear assembly I.

Figure 11:
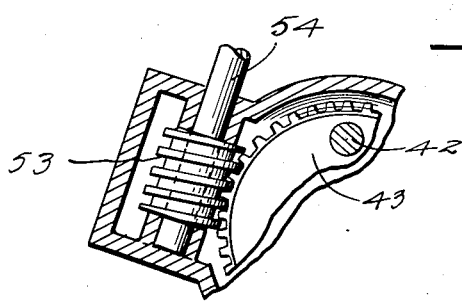
Figure 11 is a detailed fragmentary view partly in section and partly in elevation illustrating means as herein disclosed for operating the rotatable support for the mating gear.

The embodiment of my invention as particularly illustrated in Figures 7 to 11 is what might be termed an "industrial type" and wherein provision is made for a number of speeds greater than required in connection with a motor driven car. In this second form of my invention H denotes a housing or casing of desired configuration and dimensions and into which extends a drive or input shaft A with which is aligned a driven or output shaft B. The inserted end portion of the shaft A carries a power gear 40. This gear 40 has constantly meshing therewith a mating gear 41. This gear 41 is rotatably mounted upon a stud 42 carried by and extending laterally from the inner face of a worm wheel 43 rotatably mounted upon the shaft A. This wheel 43 has a hub 44 extending outwardly of the housing or casing H and the extended end portion of this hub 44 carries an index or pointer 45 which operates to indicate the setting of the mating gear 41 whereby may be readily determined the speed desired of the shaft B.

Rotatably supported by and between opposed walls of the housing or casing H is a shaft 46 and mounted on this shaft 46 for rotation therewith is a gear 47. This gear upon one position of the mating gear 41 meshes with said gear 41 and the king gear 48 mounted upon the inner end portion of the shaft B for rotation therewith.

In this assembly, as particularly illustrated in

Figure 8, the shaft B is driven at a relatively high speed but the speed of the shaft B can be varied or regulated as required by adjusting the mating gear 41 into mesh with a gear 49 comprised in any one of the various gear assemblies G. Each of these assemblies includes a shaft 50 supported by and between opposed walls of the housing or casing H and which shaft also carries a second gear 51 constantly meshing with the king gear 48. Each of the gears 49 of alternate gear assemblies is freely mounted for rotation in one direction upon the shaft 50 but is held against independent rotation in the opposite direction by a conventional type of overriding clutch 52. The gears 51 are of varying diameters as desired whereby the various speeds of the shaft B may be attained. Also, as herein disclosed, the gears 49 and 51 of every other assembly G are close together while the similar gears of the remaining intermediate assemblies G are spaced apart. This allows for an overlying relation of the gears of one assembly with those of the adjacent assemblies and assuring the transmission in its entirety being compact.

The shafts 50 of the various assemblies G are also preferably each disposed on a predetermined incline in order to assure a more compact assembly, the gears 49 and 51 being of a dish type to compensate for the arrangement of the shaft 50 so that said gears 49 and 51 will have desired mesh with the mating gear 41 and the king gear 48.

In this embodiment of my invention the worm wheel 43 has meshing therewith a worm 53 carried by a shaft 54. This shaft 54 extends exteriorly of the housing H and is provided at its extended free end portion with an operating member 55 so that an operator may rotate the shaft 54 as desired to shift the mating gear 41 into selective engagement with the gear 49 of a gear assembly G. This operation of course will be facilitated by the pointer or index 45 hereinbefore referred to.

The embodiment of my invention as illustrated in Figures 7 to 11 is particularly adapted for industrial use and it is to be understood that the gear assemblies G may be greater or less than the number illustrated by the accompanying drawings.

From the foregoing description it is thought to be obvious that a transmission constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A transmission comprising, in combination, an input shaft, an output shaft, a king gear carried by the output shaft, a plurality of gear assemblies arranged in spaced relation in a general direction circumferentially of the king gear, each of said assemblies having a gear constantly in mesh with the king gear, each of said assemblies having a second gear, a mating gear assembly including gears of different diameters, means for supporting said mating gear assembly by the input shaft for movement therearound, a power gear on the input shaft with which one of the gears of the mating gear constantly meshes, and means for shifting said mating gear assembly to bring one of the gears of the mating gear assembly into mesh with the second gear of a selected gear assembly.

2. A transmission comprising, in combination, an input shaft, an output shaft, a king gear carried by the output shaft, a plurality of gear assemblies arranged in spaced relation in a general direction circumferentially of the king gear, each of said assemblies having a gear constantly in mesh with the king gear, each of said assemblies having a second gear, a mating gear assembly including gears of different diameters, means for supporting said mating gear assembly by the input shaft for movement therearound, a power gear on the input shaft with which one of the gears of the mating gear constantly meshes, and means for shifting said mating gear assembly to bring one of the gears of the mating gear assembly into mesh with the second gear of a selected gear assembly, said mating gear assembly having a gear substantially at all times in mesh with a second gear of a gear assembly.

3. A transmission comprising, in combination, an input shaft, an output shaft, a plurality of gear assemblies, a king gear carried by the output shaft constantly meshing with gears of the various gear assemblies, a power gear carried by the input shaft, a mating gear constantly in mesh with the power gear, a supporting member freely mounted on the input shaft, and means for shifting the mating gear into position for engagement with the gear of a selected gear assembly, the mating gear meshing or lapping with a gear of a second gear assembly upon said mating gear leaving a gear of a first assembly about substantially one-third of the depth of a tooth.

4. A transmission comprising, in combination, an input shaft, an output shaft, a plurality of gear assemblies, a king gear carried by the output shaft constantly meshing with gears of the various gear assemblies, a power gear carried by the input shaft, a mating gear constantly in mesh with the power gear, a supporting member freely mounted on the input shaft, means for mounting the mating gear on said supporting member, a gear surrounding the input shaft and movable with the supporting member, a shaft supported adjacent to the input shaft and in angular relation thereto, a rack carried by the shaft meshing with the gear movable with the supporting member for turning the supporting member upon the input shaft to bring the mating gear into mesh with a gear of a selected gear assembly, and a lever carried by the last named shaft operating at will to oscillate the rack.

5. A transmission comprising, in combination, an input shaft, an output shaft, a plurality of gear assemblies, a king gear carried by the output shaft constantly meshing with gears of the various gear assemblies, a power gear carried by the input shaft, a mating gear constantly in mesh with the power gear, a worm gear freely mounted for rotation upon the input shaft, means for mounting the mating gear on said worm gear, a worm in mesh with the worm gear, and means for rotating the worm to rotate the worm gear around the input shaft to bring the mating gear into mesh with a gear of a selected gear assembly.

EDWARD J. SCHNEIDER.